(12) United States Patent
Ishizaki

(10) Patent No.: US 7,509,555 B2
(45) Date of Patent: Mar. 24, 2009

(54) RADIO APPARATUS FOR PERFORMING AUTOMATIC RETRANSMISSION

(75) Inventor: Ryuichiro Ishizaki, Tokyo (JP)

(73) Assignee: NEC Corporation, Tokyo (JP)

( * ) Notice: Subject to any disclaimer, the term of this patent is extended or adjusted under 35 U.S.C. 154(b) by 434 days.

(21) Appl. No.: 11/230,137

(22) Filed: Sep. 19, 2005

(65) Prior Publication Data

US 2006/0069976 A1 Mar. 30, 2006

(30) Foreign Application Priority Data

Sep. 27, 2004 (JP) ............................. 2004-279650

(51) Int. Cl.
*G08C 25/02* (2006.01)
(52) U.S. Cl. .................. 714/748; 714/754; 714/790
(58) Field of Classification Search ................. 714/748, 714/751, 754, 755, 790
See application file for complete search history.

(56) References Cited

U.S. PATENT DOCUMENTS

| 7,000,174 B2 * | 2/2006 | Mantha et al. ............... 714/790 |
| 7,130,295 B2 * | 10/2006 | Kim et al. .................... 370/349 |
| 7,146,552 B2 * | 12/2006 | Kim et al. .................... 714/755 |
| 2003/0126551 A1 | 7/2003 | Mantha et al. | |

FOREIGN PATENT DOCUMENTS

| JP | 06-046037 | 2/1994 |
| JP | 2003-333668 | 11/2003 |
| JP | 2003-534710 | 11/2003 |
| JP | 2003-348058 | 12/2003 |
| JP | 2004-007654 | 1/2004 |
| JP | 2004-112597 | 4/2004 |
| WO | WO 01/91355 A1 | 11/2001 |
| WO | WO 03/069822 A2 | 8/2003 |
| WO | WO 2004/028038 A1 | 4/2004 |

OTHER PUBLICATIONS

Universal Mobile Telecommunications Systems (UMTS); Multiplexing and Channel Coding (FDD) (3GPP TS 25.212 Version 6.2.0 Release 6), ETSI Standards, European Telecommunications Standards Institute, Sophia-Antipo, FR., vol. 3-R1, No. V620, Jun. 2004.
"Universal Mobile Telecommunications Systems (UMTS); Multiplexing and Channel Coding (FDD) (3GPP TS 25.212 Version 6.2.0 Release 6)", 3GPP Organizational Partners (ARIB, ATIS, CCSA, ETSI, TTA, TTC), Jun. 2004.

* cited by examiner

*Primary Examiner*—Esaw T Abraham
*Assistant Examiner*—Fritz Alphonse
(74) *Attorney, Agent, or Firm*—Scully, Scott, Murphy & Presser, P.C.

(57) ABSTRACT

A radio apparatus is disclosed for improving the throughput of data transfer using a HARQ-based automatic retransmission. The radio apparatus performs a HARQ-based automatic retransmission. In this event, a redundancy version control unit identifies a redundancy version in the retransmission based on a redundancy version in the preceding transmission in which the need for retransmission arose. A HARQ processing unit performs rate matching on each of the systematic bits and parity bits of data to be retransmitted in accordance with the redundancy version identified by the redundancy version control unit.

4 Claims, 5 Drawing Sheets

RADIO APPARATUS FOR PERFORMING AUTOMATIC RETRANSMISSION

BACKGROUND OF THE INVENTION

1. Field of the Invention

The present invention relates to a radio apparatus which performs an HARQ-based automatic retransmission.

2. Description of the Related Art

The Third-Generation Partnership Project (3GPP) defines specifications for high speed downlink packet access (HS-DPA) in order to enable high speed data transfers.

One feature of HSDPA is automatic retransmission using hybrid ARQ (HARQ: Hybrid Automatic Repeat Request). According to HARQ, a terminal performs error detection on data from a radio base station, and requests a retransmission from the radio base station if an error is detected. Based on the nature of the response from the terminal, the radio base station determines whether a retransmission is necessary and, if necessary, retransmits the data.

FIG. 1 is a diagram illustrating the flow of signal processing on the transmission side of a physical layer by a conventional general radio base station.

Referring to FIG. 1, the radio base station performs, on data to be transmitted, CRC attachment processing 81, bit scrambling processing 82, code block segmentation processing 83, and channel coding processing 84, and then performs HARQ (Physical Layer Hybrid-ARQ functionality) processing 85. HARQ processing 85 is the processing for automatic retransmission using HARQ.

After this processing, the radio base station performs physical channel segmentation processing 86, HS-DSCH interleaving processing 87, constellation re-arrangement processing 88, and physical channel mapping processing 89, and transmits data to a terminal on a physical channel (phCH).

FIG. 2 is a block diagram illustrating the configuration of an HARQ processing unit which performs HARQ processing in the signal processing of the physical layer illustrated in FIG. 1. Referring to FIG. 2, HARQ processing unit 90 has bit separation unit 91, first rate matching unit 92, virtual IR buffer 93, second rate matching unit 94, and bit collection unit 95. Then, HARQ processing unit 90 performs rate matching on input data c twice, before and after the virtual buffer, using parameters s, r of redundancy version (hereinafter called the "RV parameters") that are applied, for example, from a scheduler (not shown) in the MAC layer.

Virtual IR buffer 93 is a virtual buffer which performs buffering with a predefined buffer size.

Bit separation unit 91 separates input data c from channel coding processing 83 into systematic bits, parity 1 bits, and parity 2 bits.

First rate matching unit 92 performs rate matching processing on the systematic bits, parity 1 bits, and parity 2 bits that are from bit separation unit 91, and sends the resulting respective bits to virtual IR buffer 93. In this event, first rate matching unit 92 actually performs the processing only on the parity 1 bits and parity 2 bits (RM_P1_1, RM_P2_1), but passes the systematic bits, as they are, therethrough.

Second rate matching unit 94 performs the rate matching processing on data from virtual IR buffer 93, and sends the resulting data to bit collection unit 95. In this event, second rate matching unit 94 performs the processing on the systematic bits, parity 1 bits, and parity 2 bits (RM_S, RM_P1_2, RM_P2_2). In the rate matching in second rate matching unit 94, the number of bits Ndata of output data w is used as a parameter in addition to the RV parameters.

Bit collection unit 95 interleaves the systematic bits, parity 1 bits, and parity 2 bits from second rate matching unit 94, and delivers them as output data w.

Ndata used in second rate matching unit 94 can be derived from the number of codes and a modulation scheme after the scheduler decides to sent the data to a user who has been selected to receive it. Specifically, Ndata can be calculated by Equation (1):

$$\text{Ndata} = 3 \times (\text{Number of Bits of Modulation Scheme}) \times (\text{Number of Codes of HS-PDSCH}) \quad (1)$$

In Equation (1), the number of bits of the modulation scheme is 320 bits for QPSK, and 640 bits for 16QAM.

As described above, the automatic retransmission is performed using the HARQ processing in HSDPA, but it is important to appropriately select the redundancy version in the retransmission in accordance with a change in the environment of a propagation path in order to improve the throughput of the system. A variety of proposals have been made so far for methods to select the redundancy version (for example, see JP-A-2004-112597).

However, no method has been established at present for selecting an appropriate redundancy version, and standardization has not been achieved. Unless an appropriate redundancy version is selected whenever retransmission occurs, an appropriate resource will not be allocated to appropriate bits, resulting in an increase in the number of times of retransmission.

For example, in the retransmission, the number of bits (Nsys) of the systematic bits applied to HARQ unit 90 is the same as that in the first transmission. If there is a significant deterioration in the propagation path environment (reduction in CQI (Channel Quality Indicator) value) in the retransmission, as compared with the first transmission, and if limits are imposed on the number of available codes, only part of the systematic bits, rather than all of them, can be retransmitted depending on the selected redundancy version.

Also, even if retransmissions are repeated from the radio base station with a redundancy version which handles the systematic bits as nonpriority in a state where the systematic bits have not yet been correctly received by a terminal, correct decoding is not accomplished in the terminal, resulting in repeated retransmissions.

Since appropriate resources are not allocated in the HARQ-based automatic retransmission due to the failure to establish a method of selecting a redundancy version in transmission, it is difficult to improve the data throughput.

SUMMARY OF THE INVENTION

It is an object of the present invention to provide a radio apparatus which improves the throughput of data transfer using an HARQ-based automatic retransmission.

To achieve the above object, the radio apparatus of the present invention is a radio apparatus that performs a HARQ-based automatic retransmission, and has a redundancy version control unit and an HARQ processing unit.

The redundancy version control unit identifies a redundancy version in a retransmission based upon determination criteria which differ depending on whether the redundancy version in the preceding transmission, in which the need for retransmission arose, handled systematic bits as priority or as nonpriority. The HARQ processing unit performs rate matching on each of the systematic bits and parity bits of data to be retransmitted in accordance with the redundancy version identified by the redundancy version control unit.

According to the present invention, the redundancy version control unit determines a new redundancy version when a retransmission occurs, based on the determination criteria which differ depending on whether the systematic bits were handled as priority or nonpriority, so that an appropriate redundancy version can be determined in accordance with a situation in which the retransmission is needed.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 3:
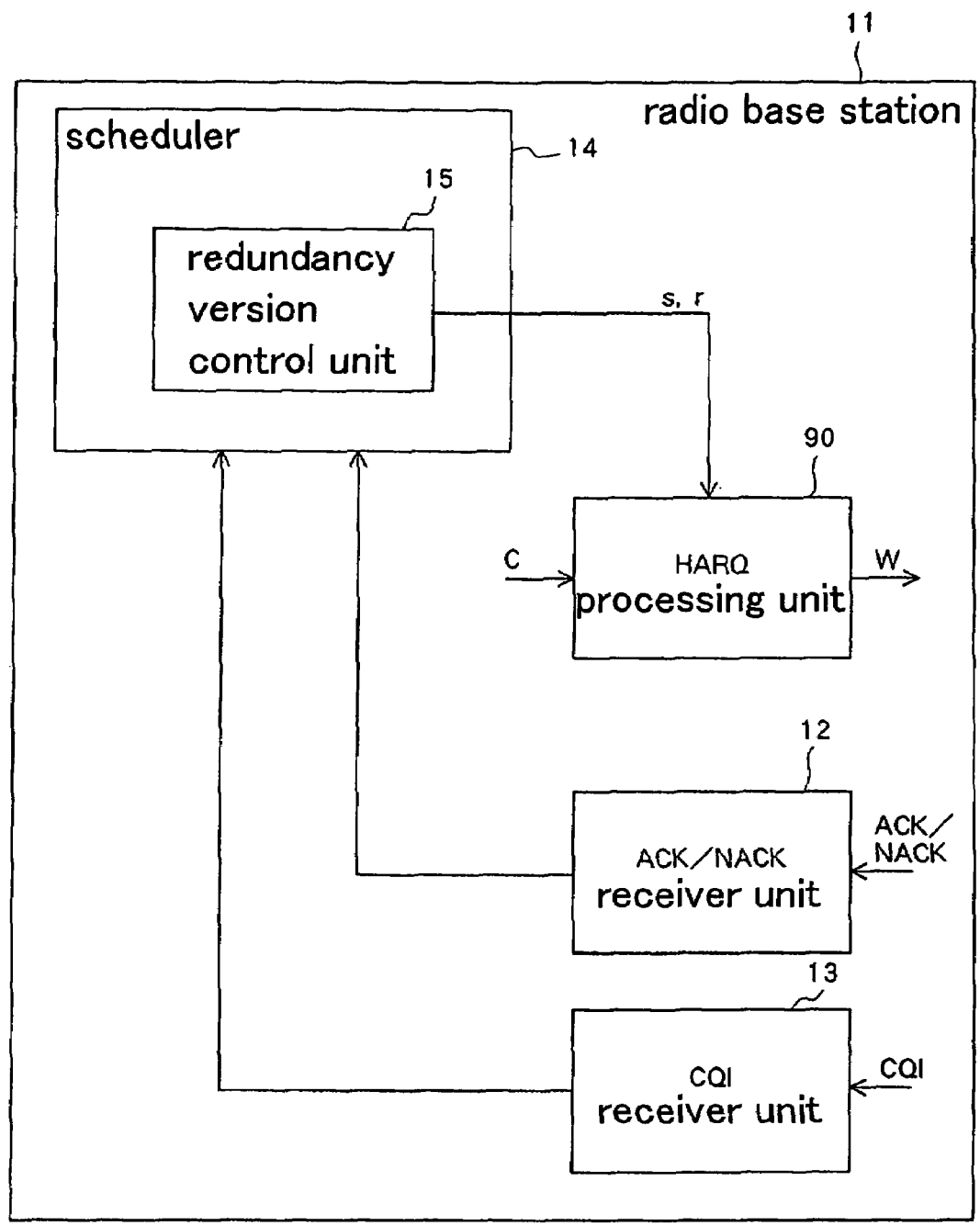
FIG. 3 is a block diagram illustrating a radio base station of one embodiment.

FIG. 3 is a block diagram illustrating the configuration of a radio base station in one embodiment. This radio base station is used in a W-CDMA mobile communications system, and performs a HARQ-based automatic retransmission in HSDPA.

Referring to FIG. 3, radio base station 11 has HARQ processing unit 90, ACK/NACK receiver unit 12, CQI receiver unit 13, and scheduler 14. Scheduler 14 has redundancy version control unit 15.

HARQ processing unit 90, which is the same as the conventional HARQ processing unit illustrated in FIG. 2, performs rate matching on input data c twice, before and after the virtual buffer, using parameters s, r of a redundancy version (hereinafter called the "RV parameters") given by scheduler 14.

Figure 1:
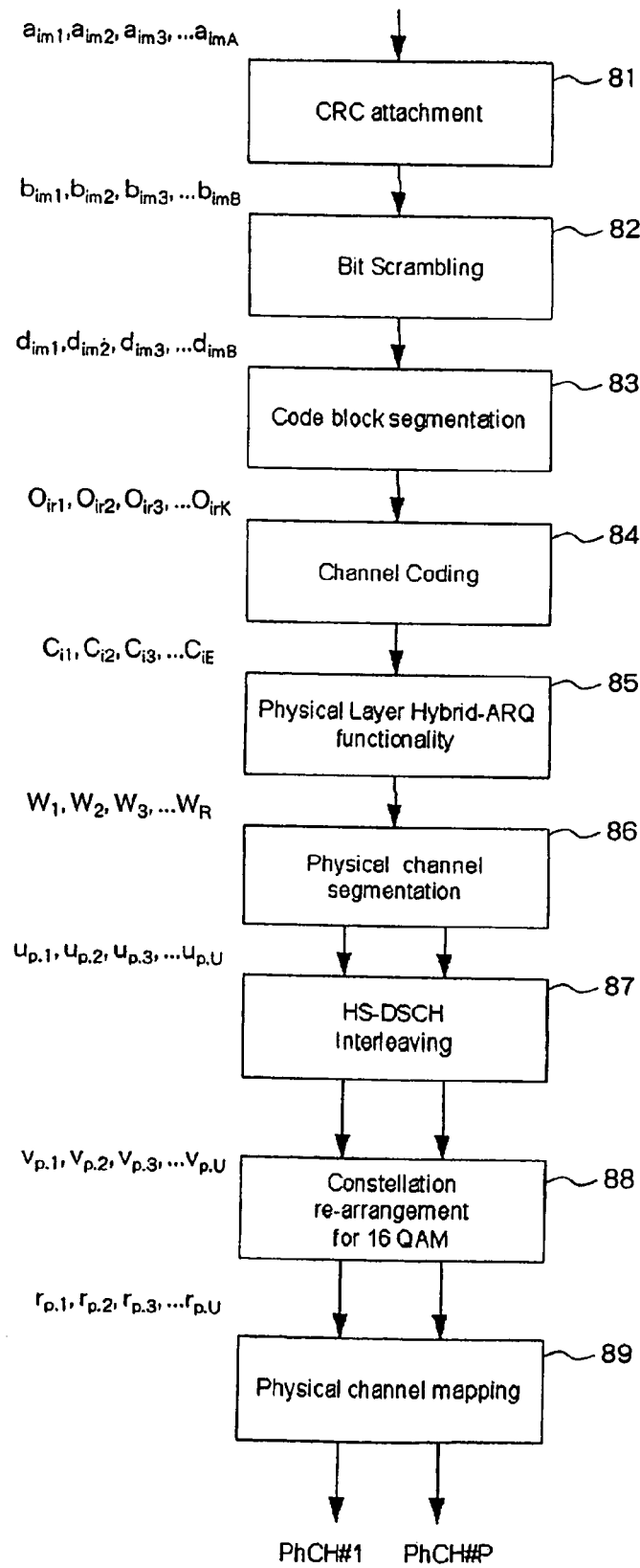
FIG. 1 is a diagram illustrating the flow of signal processing on the transmission side of the physical layer by a conventional general radio base station.
Figure 2:
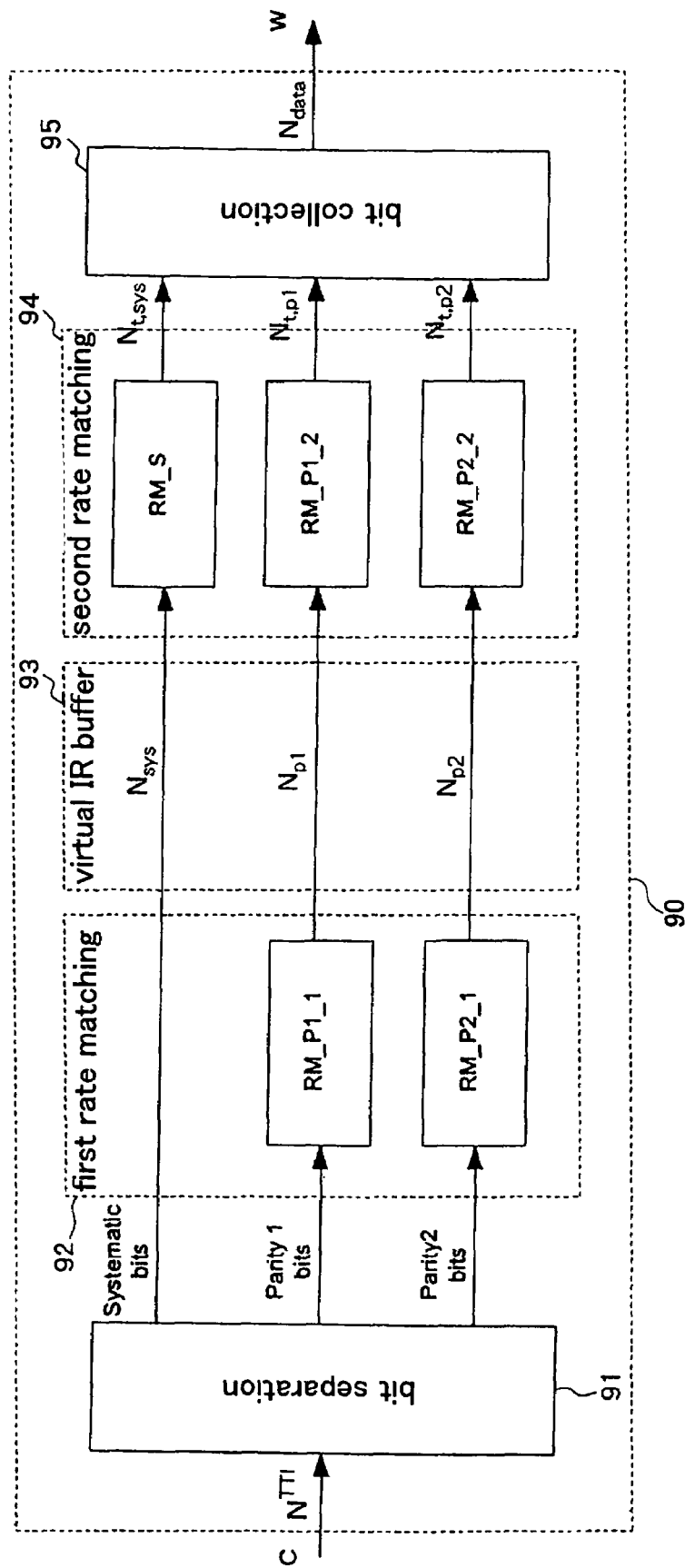
FIG. 2 is a block diagram illustrating a HARQ processing unit which performs HARQ processing in the signal processing of the physical layer illustrated in FIG. 1.

Referring to FIG. 2, virtual IR buffer 93 is a virtual buffer which performs buffering with a predefined buffer size. Bit separation unit 91 separates input data c from channel coding processing 83 into systematic bits, parity 1 bits, and parity 2 bits.

First rate matching unit 92 performs rate matching processing on the systematic bits, parity 1 bits, and parity 2 bits from bit separation unit 91, and sends the resulting respective bits to virtual IR buffer 93. In this event, first rate matching unit 92 actually performs the processing only on the parity 1 bits and parity 2 bits (RM_P1_1, RM_P2_1), but passes the systematic bits, as they are, therethrough.

Second rate matching unit 94 performs the rate matching processing on data from virtual IR buffer 93, and sends the resulting data to bit collection unit 95. In this event, second rate matching unit 94 performs the processing on the systematic bits, parity 1 bits, and parity 2 bits (RM_S, RM_P12, RM_P2_2). In the rate matching in second rate matching unit 94, the number of bits of output data w (Ndata) is used as a parameter in addition to the RV parameters.

Bit collection unit 95 interleaves the systematic bits, parity 1 bits, and parity 2 bits from second rate matching unit 94, and delivers them as output data w.

In the HARQ-based automatic retransmission of HARQ processing unit 90, a selection can be made as to whether the systematic bits are handled as priority or as nonpriority by the RV parameters. By appropriately selecting systematic bits as priority/nonpriority in accordance with a change in the environment of a propagation path, the data throughput can be improved. When RV parameter s is set to "1," the systematic bits are prioritized. When RV parameter s is set to "0," the systematic bits are handled as nonpriority, and parity bits (parity 1 bits and parity 2 bits) alone are transmitted.

ACK/NACK receiver unit 12 receives a response signal from a terminal (not shown), and sends the response signal to redundancy version control unit 15 of scheduler 14. The response signal may be an ACK signal or a NACK signal. The ACK signal is a signal which indicates that data from radio base station 11 can be normally decoded. The NACK signal is a signal which requests a retransmission due to a failure in normal decoding of data from radio base station 11.

CQI receiver unit 13 receives a CQI signal from a terminal, and sends the CQI signal to redundancy version control unit 15. The CQI signal includes a CQI value. The CQI value is a value indicative of the state of a downlink propagation path. The CQI value becomes smaller as the environment deteriorates on the propagation path.

Scheduler 14 determines a user to whom data will be sent at the next transmission timing using the response signal from ACK/NACK receiver unit 12, and the CQI signal from CQI receiver unit 13.

Also, redundancy version control unit 15 of scheduler 14 adaptively selects a redundancy version using the state of the redundancy version in the preceding transmission, and sends RV parameters s, r of the redundancy version to HARQ processing unit 90.

Figure 4:
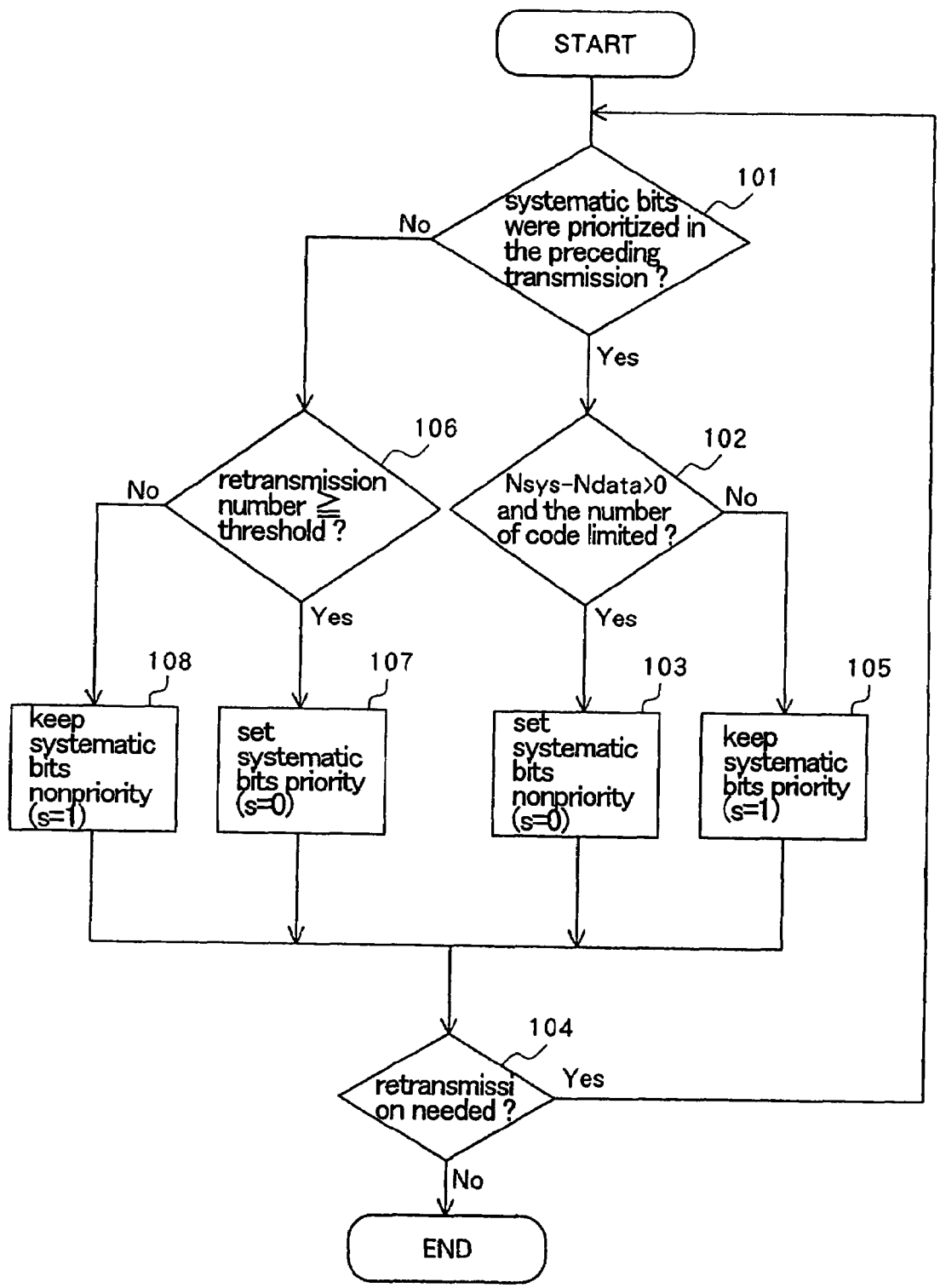
FIG. 4 is a flow chart illustrating the flow of a redundancy version selection process in an automatic retransmission by a redundancy version control unit shown in FIG. 3.

FIG. 4 is a flow chart illustrating the flow of a redundancy version selection process in the automatic retransmission by the redundancy version control unit shown in FIG. 3. Referring to FIG. 4, redundancy version control unit 15 first determines during the retransmission process whether or not the systematic bits were prioritized in the preceding transmission (step 101).

If the systematic bits were prioritized in the preceding transmission, redundancy version control unit 15 next determines whether or not Nsys-Ndata is positive and whether or not there are limits to the number of available codes (step 102).

The number of bits in input data c (Nsys) to HARQ processing unit 90 is the number of input bits to the physical layer, i.e., the number of output bits from the MAC layer. Nsys in a retransmission has the same value as Nsys in the first transmission. The number of bits in output data w (Ndata) from HARQ processing unit 90 is determined from a modulation scheme and the number of codes. Specifically, Ndata is calculated by the aforementioned Equation (1).

If Nsys is positive and there are limits to the number of available codes, redundancy version control unit 15 sets the redundancy version such that the systematic bits are handled as nonpriority, and the parity bits alone are transmitted (step 103). In this event, redundancy version control unit 15 may set RV parameter s to "0." As retransmission is performed with this setting, redundancy version control unit 15 determines whether or not retransmission is needed (step 104), followed by a return to processing at step 101 if needed, or followed by termination of the process if not needed. The retransmission is determined to be needed unless the ACK signal is received at ACK/NACK receiver unit 12.

If Nsys-Ndata is not positive or there are no limits to the number of available codes, as determined at step 102, redundancy version control unit 15 maintains the setting which prioritizes the systematic bits (step 105). In this event, redundancy version control unit 15 may maintain RV parameter s equal to "1." As a retransmission is performed with this setting, redundancy version control unit 15 proceeds to processing at step 104.

If the systematic bits were nonpriority in the preceding transmission, as determined at step 101, redundancy version control unit 15 next determines whether or not the number of times of retransmission is equal to or larger than a predetermined threshold (step 106). This threshold is intended to determine, based on the number of times of retransmission, whether the systematic bits have not been normally received by the terminal, and the threshold is set to adapt to the system.

If the number of times of retransmission is equal to or larger than the threshold, redundancy version control unit 15 sets the redundancy version such that the systematic bits are handled as priority (step 107). In this event, redundancy version control unit 15 may set RV parameter s to "1." As a retransmission is performed with this setting, redundancy version control unit 15 proceeds to processing at step 104.

If the number of times of retransmission is smaller than the threshold, as determined at step 106, redundancy version control unit 15 maintains the setting of the redundancy version which handles the systematic bits as nonpriority (step 108). In this event, redundancy version control unit 15 may maintain RV parameter s equal to "0." As a retransmission is performed with this setting, redundancy version control unit 15 proceeds to processing at step 104.

FIG. 4 illustrates only the control process for RV parameter s, wherein there are no particular limits to the control process for RV parameter r.

Figure 5:
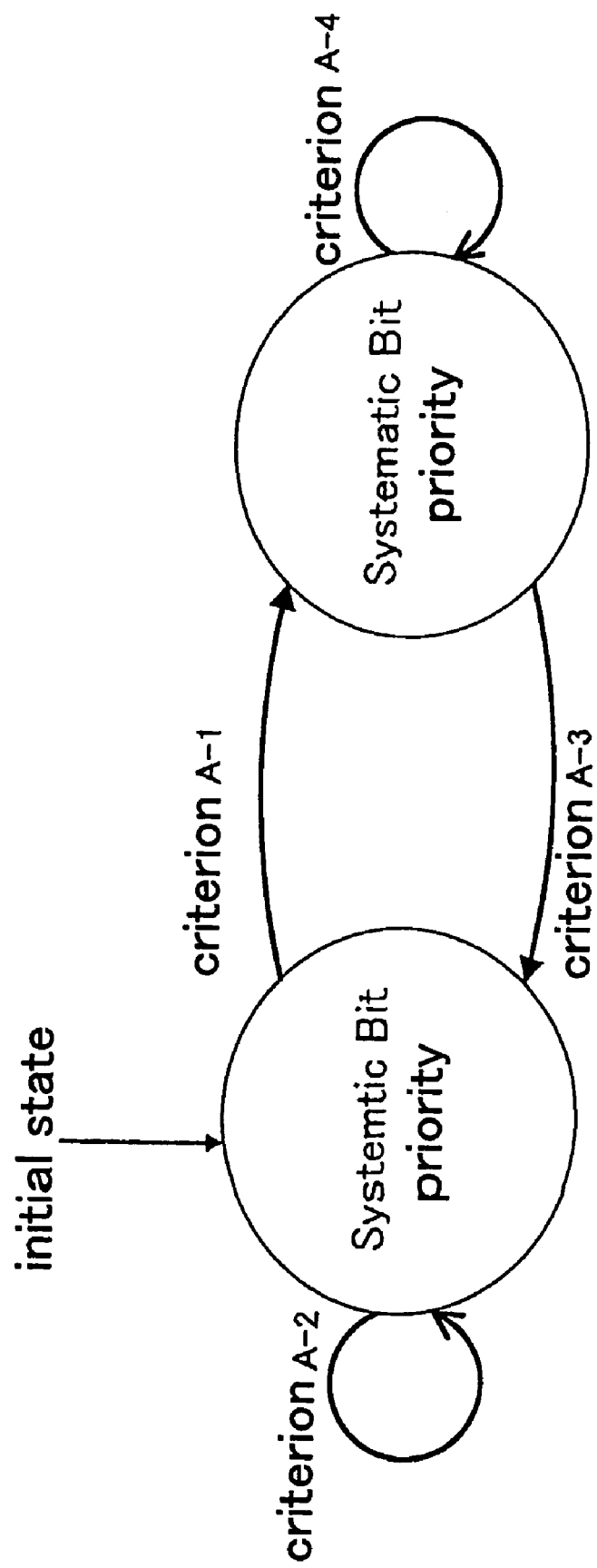
FIG. 5 is a state transition diagram of the redundancy version carried out by the operation shown in FIG. 4.

FIG. 5 is a state transition diagram of the redundancy version carried out by the operation shown in FIG. 4. Referring to FIG. 5, the systematic bits are handled as priority in the first retransmission.

In this state, if Nsys-Ndata is positive, and if there are limits to the number of available codes (condition A1), the redundancy version transitions to a state in which the systematic bits are handled as nonpriority. On the other hand, if Nsys-Ndata is not positive or if there are no limits to the number of available codes (condition A2), the redundancy version is maintained in the state in which the systematic bits are handled as priority.

On the other hand, in a state in which the systematic bits are handled as nonpriority, if the number of times of retransmission is smaller than the threshold (condition A4), the redundancy version is maintained in the state in which the systematic bits are handled as nonpriority. Conversely, if the number of times of retransmission is equal to or larger than the threshold (condition A3), the redundancy version transitions to the state in which the systematic bits are handled as priority.

As described above, in this embodiment, since redundancy version control unit 15 determines a new redundancy version based on the determination criteria which differs depending on whether the redundancy version in the preceding transmission handled the systematic bits as priority or nonpriority, an appropriate redundancy version can be determined in accordance with a situation in which a retransmission is needed, thus improving the data throughput.

Also, according to this embodiment, when the systematic bits were handled as priority in the preceding transmission, redundancy version control unit 15 sets the redundancy version which handles the systematic bits as nonpriority and transmits the parity bits alone if the value of Nsys-Ndata is positive, and if there are limits to the number of available codes. Thus, even if the number of output bits from the physical layer is smaller than the number of bits input to the physical layer, its influence can be reduced to improve the coding rate. Then, as a result, data is correctly decoded at a terminal with a higher possibility to improve the throughput.

Also, according to this embodiment, when the systematic bits were handled as nonpriority in the preceding transmission, redundancy version control unit 15 sets the redundancy version such that systematic bits are prioritized if the number of times of retransmission is equal to or larger than the threshold. When the retransmission has been repeated a number of times equal to or larger than the threshold, it can be thought that the systematic bits have not been correctly received by the terminal, so that the redundancy version is set to prioritize the systematic bits. As a result, data is correctly decoded at the terminal with higher possibility to improve the throughput.

As appreciated, the embodiment is only a preferred example of the present invention, and the present invention is not limited to this embodiment, but can be widely applied when HARQ is utilized. As another example to which the present invention can be applied, there is a radio apparatus which employs HARQ for EUDCH (Enhanced Uplink DCH) that is under investigation in 3GPP, like HSDPA.

While preferred embodiments of the present invention have been described using specific terms, such description is for illustrative purposes only, and it is to be understood that changes and variations may be made without departing from the spirit or scope of the following claims.

What is claimed is:

1. A radio apparatus for performing a HARQ (Hybrid Automatic Repeat Request)-based automatic retransmission, comprising:
    a redundancy version control unit for identifying a redundancy version in the preceding retransmission when a retransmission is needed based on a determination criteria which differs depending on whether the redundancy version in the preceding transmission handled systematic bits as priority or as nonpriority; and
    a HARQ processing unit for performing rate matching for each of the systematic bits and parity bits of data to be retransmitted in accordance with the redundancy version identified by said redundancy version control unit,
    wherein, when the redundancy version in the preceding transmission handled the systematic bits as priority:
    said redundancy version control unit will now specify the systematic bits as nonpriority in the redundancy version in the retransmission if the number of bits of the systematic bits applied to said HARQ processing unit is larger than the number of bits delivered from said HARQ processing unit, and if there are limits to the number of available codes; and
    said redundancy version control unit will maintain the systematic bits as unchanged from priority in the redundancy version in the retransmission if the number of the systematic bits applied to said HARQ processing unit is equal to or smaller than the number of bits delivered from said HARQ processing unit and/or if there are no limits to the number of available codes.

2. The apparatus according to claim 1, wherein said redundancy version control unit counts the number of times of retransmission, wherein:
    when the redundancy version in the preceding transmission handled the systematic bits as nonpriority:

said redundancy version control unit will now specify the systematic bits as priority in the redundancy version in the retransmission if the number of times of retransmission is equal to or larger than a predetermined threshold; and said redundancy version control unit will maintain the systematic bits unchanged from nonpriority in the redundancy version in the retransmission if the number of times of retransmission is smaller than the threshold.

3. A method of automatically retransmitting in accordance with HARQ HARQ (Hybrid Automatic Repeat Request) processing, comprising:

a first step of identifying a redundancy version in the preceding retransmission when a retransmission is needed, based on determination criteria which differ depending on whether the redundancy version in the preceding transmission handled systematic bits as priority or as nonpriority; and a second step of performing rate matching for each of the systematic bits and parity bits of data to be retransmitted in accordance with the redundancy version identified at said first step, when the redundancy version in the preceding transmission handled the systematic bits as priority:

the systematic bits will now be specified as nonpriority in the redundancy version in the retransmission if the number of bits of the systematic bits applied to said HARQ processing unit is larger than the number of bits delivered from said HARQ processing unit, and if there are limits to the number of available codes; and the systematic bits will be maintained unchanged from priority in the redundancy version in the retransmission if the number of the systematic bits applied to said HARQ processing unit is equal to or smaller than the number of bits delivered from said HARQ processing unit or if there are no limits to the number of available codes.

4. The method according to claim 3, wherein:

when the redundancy version in the preceding transmission handled the systematic bits as nonpriority:

the systematic bits will now be specified as priority in the redundancy version in the retransmission if the number of times of retransmission is equal to or larger than a predetermined threshold; and the systematic bits will be maintained unchanged from nonpriority in the redundancy version in the retransmission if the number of times of retransmission is smaller than the threshold.

* * * * *